United States Patent [19]

Ezawa

[11] Patent Number: 5,746,383

[45] Date of Patent: May 5, 1998

[54] FILM FORWARDING DEVICE

[75] Inventor: Akira Ezawa, Kawasaki, Japan

[73] Assignee: Nikon Corporation, Tokyo, Japan

[21] Appl. No.: 632,066

[22] Filed: Apr. 15, 1996

[30] Foreign Application Priority Data

Apr. 17, 1995 [JP] Japan .................... 7-090657

[51] Int. Cl.$^6$ .................................................... G03B 1/58
[52] U.S. Cl. ........................ 242/332.7; 242/548; 396/415
[58] Field of Search ............................. 242/332.7, 348, 242/532.7, 547, 548; 396/415

[56] References Cited

U.S. PATENT DOCUMENTS

| 2,877,957 | 3/1959 | Hyman | 242/548 |
| 3,417,934 | 12/1968 | Palm | 242/548 X |
| 3,499,376 | 3/1970 | Swift | 242/332.7 |
| 3,602,448 | 8/1971 | Muensterer | 242/547 |
| 5,046,679 | 9/1991 | Wolf et al. | 242/348.4 |
| 5,046,680 | 9/1991 | Niedospial et al. | 242/348.4 |
| 5,046,681 | 9/1991 | Niedospial | 242/348.4 |
| 5,046,682 | 9/1991 | Niedospial | 242/348.4 |

*Primary Examiner*—John Q. Nguyen
*Attorney, Agent, or Firm*—Oliff & Berridge, PLC

[57] ABSTRACT

The film forwarding device of the present invention includes: a take up spool which takes up a film upon a circumferential outer surface of the take up spool, the film having, upon a leading end of the film, a projecting portion a normal line to which is substantially parallel to a direction of forwarding of the film, and a sloping portion, connected to the projecting portion, which slopes with respect to a transverse direction perpendicular to the direction of forwarding the film; a pressure member which presses the film against the circumferential outer surface of the take up spool; and an advancing mechanism which pushes out the film from a film cartridge and advances the film at least until taking up of the film by the take up spool has started, wherein the pressure member is located so as to initially come into contact with the projecting portion of the leading end of the film, when the taking up of the film by the take up spool starts.

2 Claims, 6 Drawing Sheets

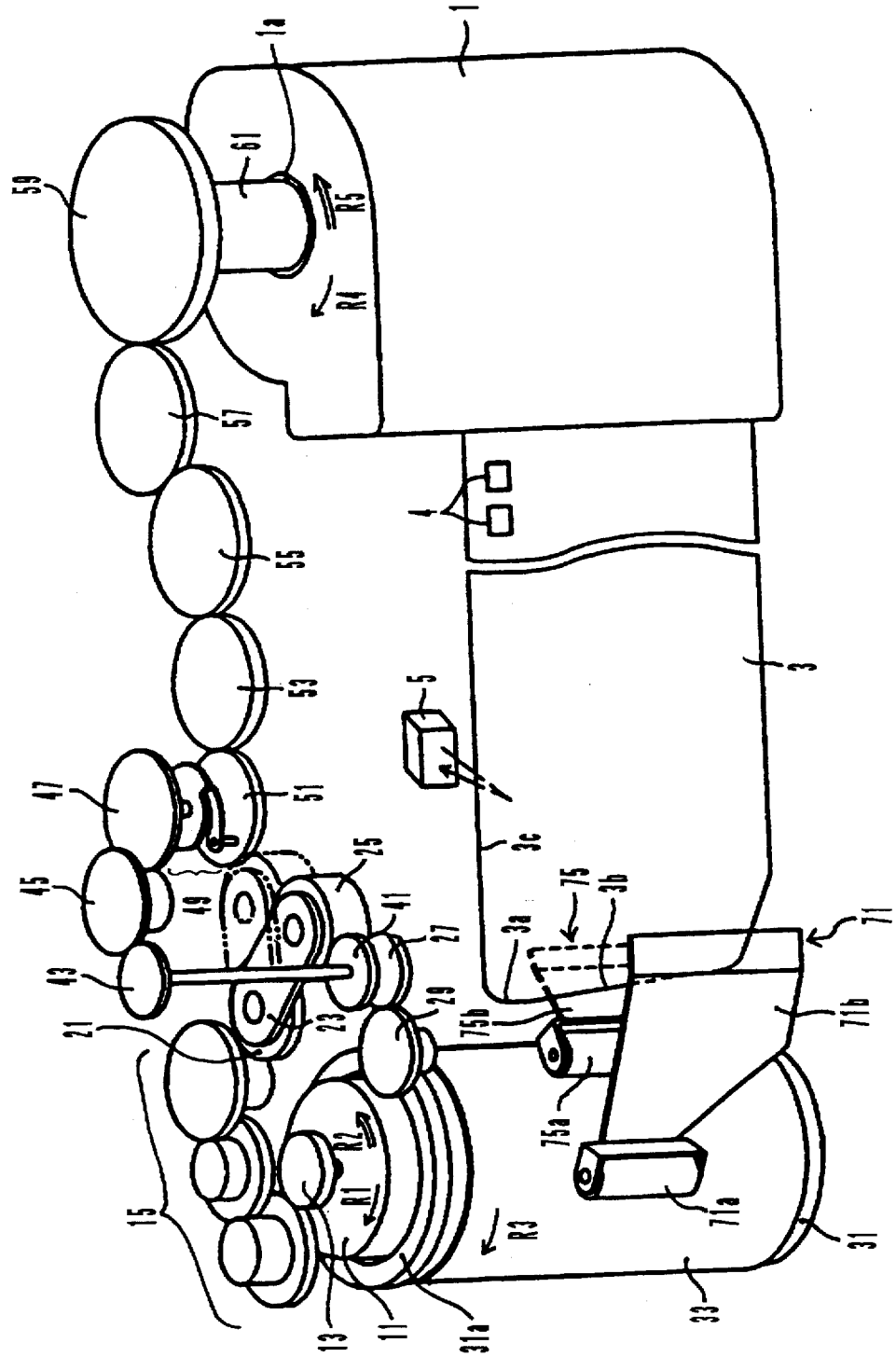

1

FILM FORWARDING DEVICE

BACKGROUND OF THE INVENTION

1. Field of the Invention

The present invention relates to a film forwarding device for a camera or the like.

2. Description of the Related Art

In U.S. Pat. Nos. 5,046,679 through 5,046,682, for example, there is disclosed a film cartridge in which a spool shaft is rotated so as to push a film out from the cartridge. As a film forwarding device for this type of film cartridge, there is per se known, for example, the one shown in FIG. 5. With this device, the rotation of a motor 11 is transmitted to a planetary gear 25 via a pinion gear 13, a speed reducing gear train 15, and a sun gear 21. When the motor 11 rotates in its direction shown by the arrow R1 in the figure, an arm 23 is swung to its position shown by the solid lines, and the rotation of the planetary gear 25 is transmitted to gears 27 and 41. The rotation of the gear 27 is transmitted to a gear 31a of a take up spool 31 via a gear 29, and the take up spool 31 is thereby rotated in its direction shown by the arrow R3 in the figure. A rubber sleeve 33 is fitted around the outer surface of the take up spool 31, and a first pressure assembly 71 and a second pressure assembly 75 are provided near the surface thereof for pressing a film 3 onto the take up spool 31. These pressure assemblies 71 and 75 are provided with respective rollers 71a and 75a which can respectively contact with the outer surface of the rubber sleeve 33 and with respective plate springs 71b and 75b which respectively bias these rollers 71a and 75a against the outer surface of the rubber sleeve 33.

On the other hand, the rotation which is transmitted from the planetary gear 25 to the gear 41 is transmitted to a fork shaft 61 via gears 43 through 47, a one way clutch 49, and gears 51 through 59. In this manner, the fork shaft 61 is rotated in the direction shown by the arrow R4 in the figure, and a spool shaft 1a of a film cartridge 1 which is engaged with the fork shaft 61 is likewise rotated in the direction shown by the arrow R4 in the figure. By this rotation, the leading end of the film 3 which is stored within the film cartridge 1 is pushed out of the film cartridge 1 and is advanced in the direction to the take up spool 31. Since the sizes of the gears etc. are arranged so that the peripheral speed of the outer surface of the rotating rubber sleeve 33 on the take up spool 31 is greater than the speed at which the leading end of the film 3 is forwarded out of the film cartridge 1 by the driving of its spool shaft 1a, thereby the leading end of the film 3 is picked up by the rotational force of the take up spool 31, when this leading end of the film 3 arrives to be pressed by the roller 71a of the first pressure assembly 71 against the rubber sleeve 33. At the subsequent time point when the leading end of the film 3 has traveled so far around the rubber sleeve 33 as to be pressed by the roller 75a of the second pressure assembly 75 against the rubber sleeve 33, the film 3 has almost been wound around the take up spool 31 by one full turn, and thereafter as the take up spool 31 continues to rotate the film 3 is wound up upon it in a multi-layered coil. When the film 3 has been wound on by a predetermined amount at which point the first film frame is in an appropriate position for photography, a perforation 4 formed in the film 3 for indicating this condition is detected by a sensor 5, and the operation of the motor 11 is stopped. Thereafter, frame exposure and film forwarding are performed in turn repeatedly. When the film 3 has become wound up upon the take up spool 31 to a certain extent, the speed of rotation of the fork shaft 61 which is transmitted from the take up spool 31 via the film 3 and the spool shaft 1a becomes greater than the speed of rotation of the fork shaft 61 which is transmitted via the gears 51 through 59. However, this will cause no problem, because this speed difference is absorbed by the one way clutch 49. When the time comes to rewind the film 3, the motor 11 is operated in the rotational direction shown by the arrow R2 in the figure, and the arm 23 is swung to its position shown by the double dotted lines, so that the rotation of the planetary gear 25 is transmitted, via the gears 51 through 59, to the spool shaft 1a so as to rotate it in the rotational direction shown by the arrow R5 in the figure. At this time, the take up spool 31 rotates freely.

As shown in FIGS. 6A through 6C, the leading end of the film 3, considered in the direction across the film, is formed with a projecting tip portion 3a at its one side and with a sloping portion 3b extending from this projecting tip portion 3a across the width of the film 3. Moreover, the rollers 71a and 75a (only the roller 71a is shown in FIGS. 6A through 6C) are both positioned centrally to the film 3 with regard to its transverse direction. For this reason, even if the film 3 is pushed out and advanced quite straight towards the roller 71a of the first pressure assembly 71 as shown in FIG. 6A, at the time point when the roller 71a and the film 3 first come into contact, the film 3 tends to sideslip with respect to its transverse direction, and as shown in FIG. 6B the upper edge 3c of the film 3 may come into contact with a wall surface 35 in the vicinity of the take up spool 31. Thereafter, as shown in FIG. 6C, the film 3 continues to be wound up on the take up spool 31 with its upper edge 3c remaining in contact with this wall surface 35 and sliding thereagainst. Even when the roller 75a of the second pressure assembly 75 and the film 3 come into contact, and thereafter, the situation remains the same. When in this manner the film 3 continues to be forwarded while being contacted with the wall surface 35, the resistance to forwarding of the film 3 is increased, which causes the speed of forwarding to be reduced, and also leads to unduly quick depletion of the battery of the camera.

SUMMARY OF THE INVENTION

The objective of the present invention is to propose a film forwarding device which can prevent sideslipping of the film when it is being engaged to a take up spool.

In order to attain this objective, the present invention proposes, according to its one aspect, a film forwarding device comprising: a take up spool which takes up a film upon a circumferential outer surface of the take up spool, the film having, upon a leading end of the film, a projecting portion a normal line to which is substantially parallel to a direction of forwarding of the film, and a sloping portion, connected to the projecting portion, which slopes with respect to a transverse direction perpendicular to the direction of forwarding the film; a pressure member which presses the film against the circumferential outer surface of the take up spool; and an advancing mechanism which pushes out the film from a film cartridge and advances the film at least until taking up of the film by the take up spool has started, wherein the pressure member is located so as to initially come into contact with the projecting portion of the leading end of the film, when the taking up of the film by the take up spool starts.

Further, according to another aspect of the present invention, there is proposed a film forwarding device comprising: a take up spool which takes up a film upon a circumferential outer surface of the take up spool, the film having, upon a leading end of the film, a flat portion which is substantially parallel to a transverse direction perpendicular to a direction of forwarding of the film, and a sloping portion, connected to the flat portion, which slopes with respect to the transverse direction; a pressure member which presses the film against the circumferential outer surface of the take up spool; and an advancing mechanism which pushes out the film from a film cartridge and advances the film at least until taking up of the film by the take up spool has started, wherein the pressure member is located so as to initially come into contact with the flat portion of the leading end of the film, when the taking up of the film by the take up spool starts.

BRIEF DESCRIPTION OF THE DRAWINGS

FIG. 5 is a schematic perspective view showing an exemplary prior art film forwarding device; and:

DESCRIPTION OF THE PREFERRED EMBODIMENTS

Three preferred embodiments of the film forwarding device of the present invention will now be explained with reference to FIGS. 1 through 4. Elements of these three preferred embodiments which correspond to elements present in the prior art film forwarding device shown in FIG. 5 and FIGS. 6A through 6C will be denoted by the same reference symbols, and description thereof will be curtailed.

Preferred Embodiment 1

Figure 1:
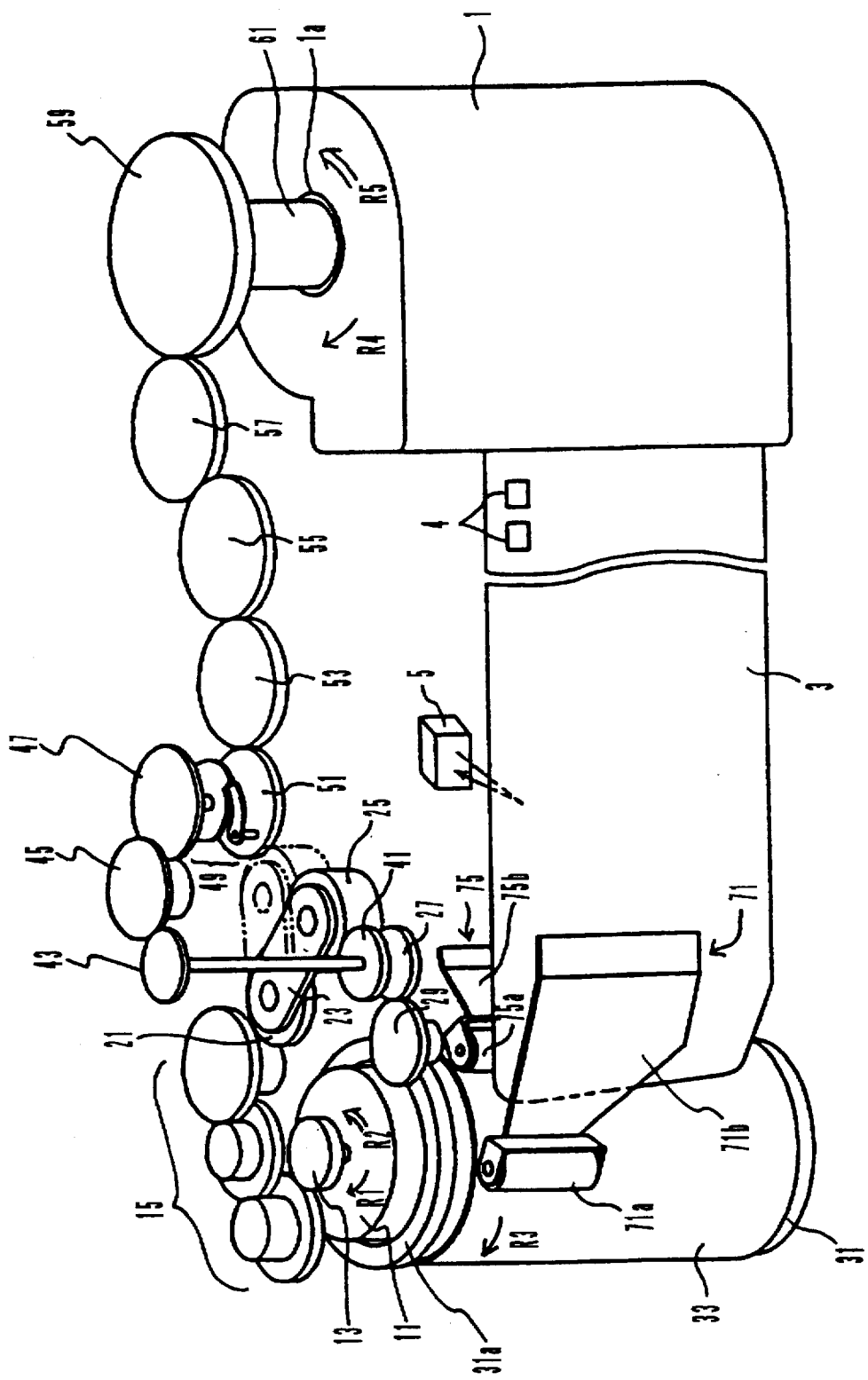
FIG. 1 is a schematic perspective view showing a first preferred embodiment of the film forwarding device of the present invention.
Figure 2:
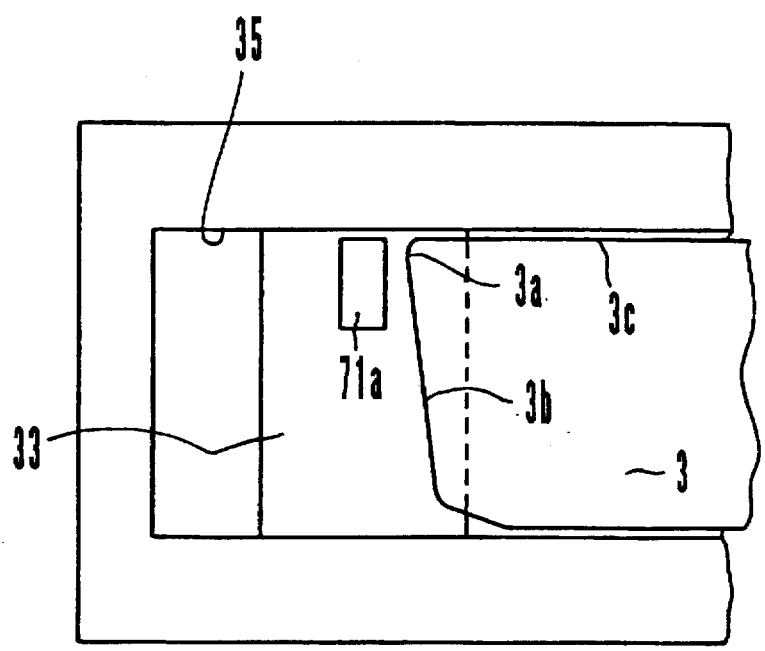
FIG. 2 is an enlarged view of a portion of FIG. 1 which includes the vicinity of a film take up spool.

FIG. 1 is a schematic perspective view showing a first preferred embodiment film forwarding device, while FIG. 2 is an enlarged view of a portion of FIG. 1 which includes the vicinity of a film take up spool. As shown in these figures, in this first preferred embodiment, respective rollers 71a and 75a (in FIG. 2, only the roller 71a is shown) of first and second pressure assemblies 71 and 75, which have the same constructions as ones shown in FIG. 5, are provided so as initially to come into contact with the projecting tip portion 3a of the film 3 when the initial winding of the film 3 is started. Since the rotational axes of the rollers 71a and 75a are almost perpendicular to the direction of forwarding of the film 3, and the direction of the normal line to the very front point of the projecting tip portion 3a of the film 3 coincides with the direction of forwarding of the film 3 (the direction parallel to the upper edge 3c), therefore, when the rollers 71a and 75a come into contact with the film 3, no sideslipping force in the direction across the film 3 is generated, so that contacting between the upper edge 3c of the film 3 and the wall surface 35 is prevented. This first preferred embodiment is especially applicable in the case that it is not possible to provide a flattened portion on the leading edge of the film 3, which case is described in the third preferred embodiment later.

Preferred Embodiment 2

Figure 3:
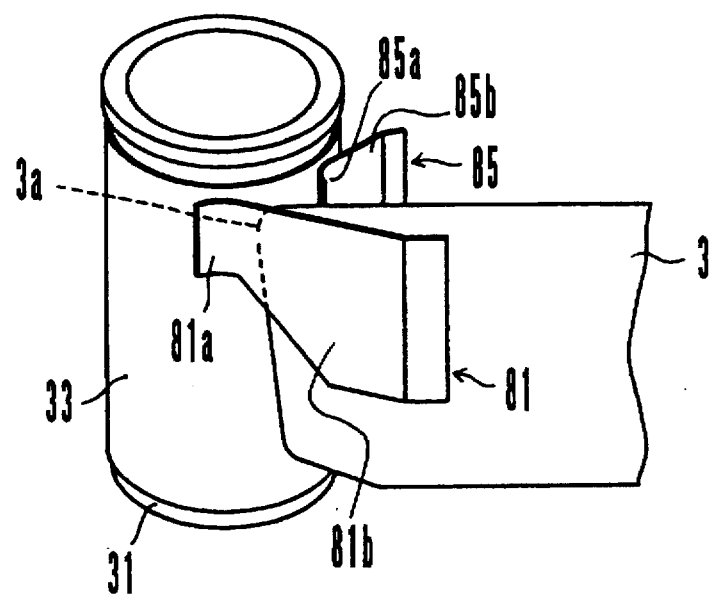
FIG. 3 is an enlarged view of the vicinity of a film take up spool of a second preferred embodiment of the film forwarding device of the present invention.

FIG. 3 is an enlarged view of the vicinity of a film take up spool of a second preferred embodiment of the film forwarding device of the present invention. In this second preferred embodiment, instead of the pressure assemblies 71 and 75 of the first preferred embodiment described above, a first pressure member 81 and a second pressure member 85 are provided. These pressure members 81 and 85 comprise respective plate springs 81b and 85b, and respective pressure portions 81a and 85a which are formed by bending the tips of the plate springs 81b and 85b. The pressure portions 81a and 85a are provided in positions so as to contact the projecting tip portion 3a of the film 3, in the same manner as in the first preferred embodiment of the present invention described above.

Preferred Embodiment 3

Figure 4:
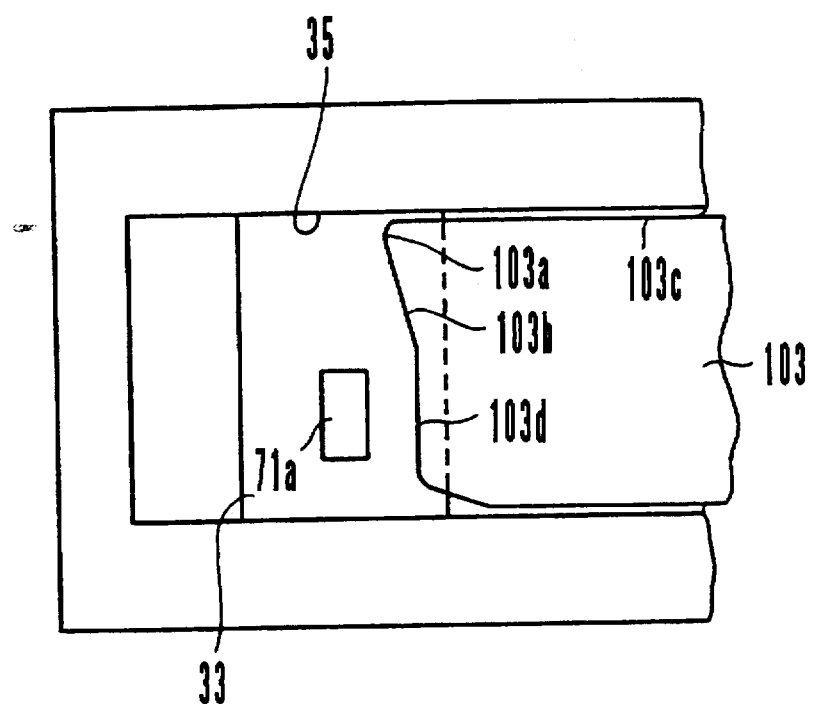
FIG. 4 is an enlarged view of the vicinity of a film take up spool of a third preferred embodiment of the film forwarding device of the present invention.
Figure 6A:
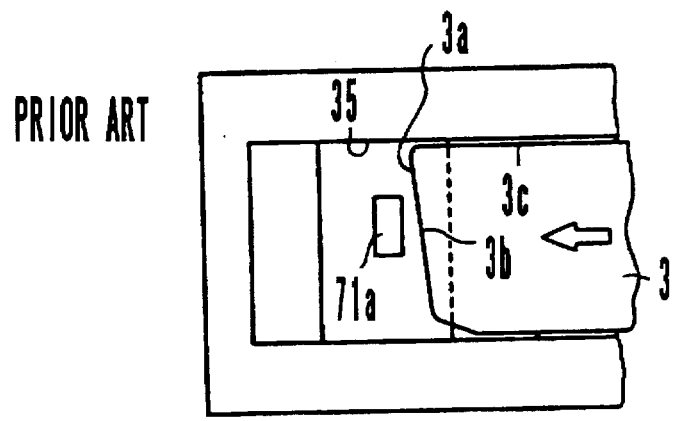
FIGS. 6A through FIG. 6C are figures for explaining a certain problem that occurs with the prior art film forwarding device of FIG. 5.
Figure 6B:
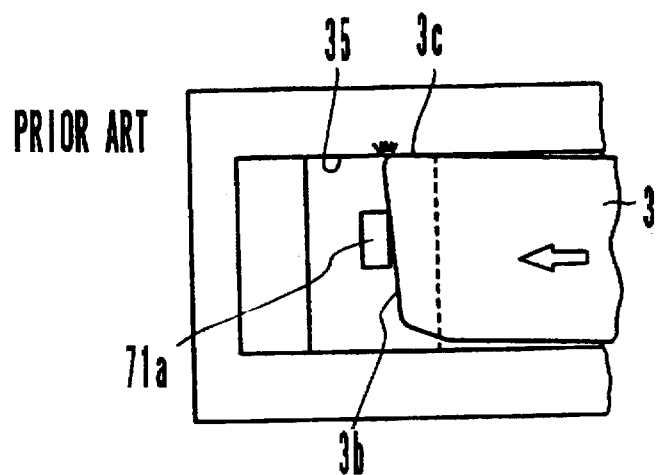
Figure 6C:
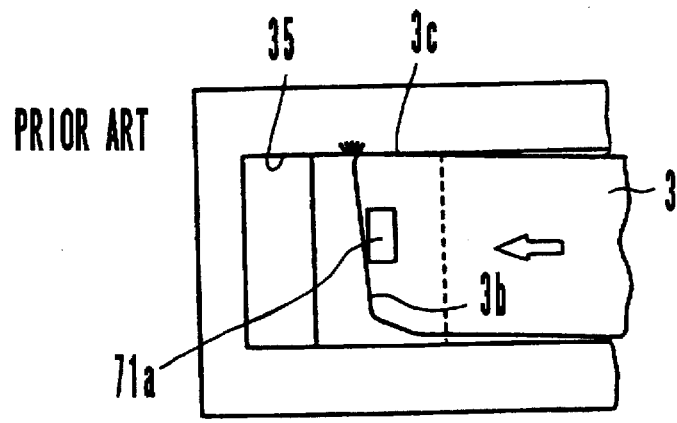

The third preferred embodiment of the present invention will now be explained with reference to FIG. 4, which is an enlarged view of the vicinity of a film take up spool of a third preferred embodiment of the film forwarding device of the present invention. In this third preferred embodiment, the leading end of the film 103 is formed, in the transverse direction across the film 103, with a projecting tip portion 103a near the upper edge 103c of the film 103 in the figure, with a sloping portion 103b extending from this projecting tip portion 103a partway across the width of the film 103, and with a straight portion 103d extending from this sloping portion 103b substantially to the other edge of the film 103. This straight portion 103d is substantially perpendicular to the direction of forwarding of the film 3 (the direction parallel to the upper edge 103c). And respective rollers 71a and 75a of first and second pressure assemblies 71 and 75 (in FIG. 4, only the roller 71a is shown) are provided so as initially to come into contact with this straight portion 103d of the film 103 when the initial winding of the film 103 is started. Thus no sideslipping force in the direction across the film 103 is generated, and contacting between the film 103 and the wall surface 35 is thereby prevented.

What is claimed is:

1. A film forwarding device, comprising:

a take up spool which takes up a film upon a circumferential outer surface of the take up spool, the film having, upon a leading end of the film, a projecting portion and a sloping portion, connected to the projecting portion, which slopes with respect to a transverse direction perpendicular to a direction of forwarding the film, the projecting portion being a tip of the film positioned on the right-hand side in the direction of forwarding the film;

a pressure member which presses the film against said circumferential outer surface of the take up spool; and an advancing mechanism which pushes out the film from a film cartridge and advances the film at least until taking up of the film by said take up spool has started, wherein said pressure member is located so as to initially come into contact with the film at the projecting portion of the leading end of the film, when the taking up of the film by the take up spool starts.

2. A film forwarding device according to claim 1, wherein a portion of said pressure member which contacts the film is a roller which rotates as the film is forwarded.

* * * * *